Feb. 17, 1925.
E. L. LONGAN
1,527,051
EDUCATIONAL BLOCKS
Original Filed May 8, 1923
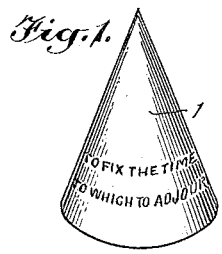
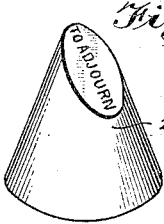
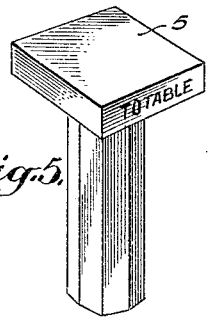
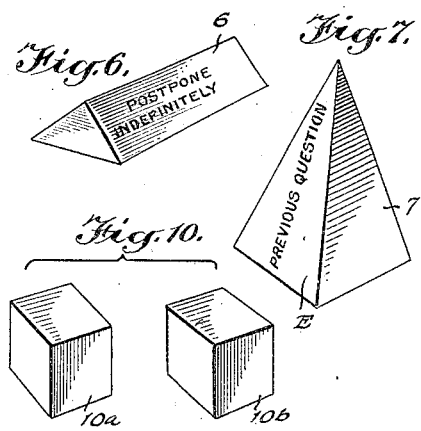
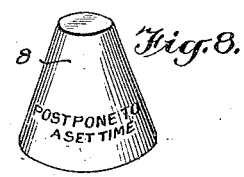
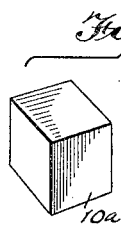
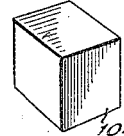
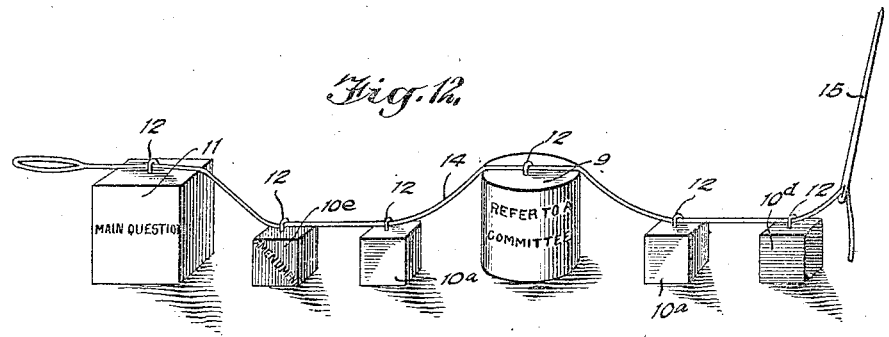
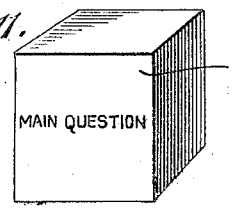
WITNESSES
INVENTOR
EMMA LARD LONGAN
BY
ATTORNEYS Patented Feb. 17, 1925.

1,527,051

UNITED STATES PATENT OFFICE.

EMMA LARD LONGAN, OF KANSAS CITY, MISSOURI.

EDUCATIONAL BLOCKS.

Application filed May 8, 1923, Serial No. 637,540. Renewed December 15, 1924.

*To all whom it may concern:*

Be it known that I, EMMA LARD LONGAN, a citizen of the United States, and a resident of Kansas City, in the county of Jackson and State of Missouri, have invented new and Improved Educational Blocks, of which the following is a full, clear, and exact description.

The object of this invention is to provide a novel educational device for teaching any science having laws or principles of different powers relative to each other, which relative powers vary as the laws or principles are variously arranged within zones of mutual influence; and more particularly the invention aims to provide such educational devices for teaching the principles of parliamentary law, a science which it is well-known has heretofore presented great difficulties when instruction as to the intricacies thereof has sought to be imparted. I have, however, made the pedagogical discovery that when certain of the underlying theories of parliamentary law are presented graphically, the logical reasons for such principles so presented automatically explain and justify other and lesser principles, and so the mastery of the science becomes comparatively easy and a simple matter. It is a well appreciated fact that an attempted study of the principles of parliamentary law from perusals and efforts to memorize particular passages in the well-known Cushing's Manual and other textbooks of equal authority have often resulted in piling mental confusion upon mental confusion; so much so, indeed, that even veteran legislators are sometimes at a loss to understand a ruling from the chair and embarrassed by a feeling that perhaps an important ruling is erroneous and yet not certain of the grounds for such feeling.

According to the present invention, there is provided a device for use in the instruction in a number of sciences, and particularly in the science of parliamentary law, whereby a few main and what may be termed sign-post principles may be graphically presented, for instant comprehension by the memory and with the result that naturally consequent relations between the graphically presented principles and the other principles become quite clear and well entrenched in the mind. In carrying out the new educational method, use is made of a plurality of educational elements, as wooden blocks, each element an individual and self-complete structure whereby various pluralities of such structures are employable in various visually significant combinations at will, for the graphic teaching of various mutually reactant effects of certain principles on others in the particular combination displayed.

In carrying out the invention for use in the teaching of the principles of parliamentary law, the elements are preferably blocks as aforesaid, and a block of characteristic shape is allotted to a particular principle. As is well-known to students of parliamentary law, the various principles all have to do with the relative powers, precedences and order of making of the so-called motions, such as the motion for the main question, the motion or motions to amend the main question, or to amend an amendment to the main question, the motion for the previous question, the motion to commit, the motion to table, the motion to adjourn, the motion or rising to a question of privilege (or point of order), etc., etc. The various motions, some of the important ones of which have just been mentioned, are divided by students of the science into three classes, to wit, the four privileged motions, the slightly greater plurality of secondary or subsidiary motions, and the five incidental motions. According to previous teachers of parliamentary law, attempts have been made to teach the science by giving as much importance and prominence to discussions regarding the incidental motions, as to the first two classes of motions mentioned above. I have discovered, however, that such a method is not sound, and especially with children, all of whom should, it is now recognized, be grounded thoroughly not only in economics and civics but in the branch of the latter study having to do with the principles of parliamentary law. The one certain way, or at least a way I have found to be of great value, in the teaching of parliamentary law, to permit quick, correct and permanent inculcation of the fundamentals thereof, is the teaching graphically and thoroughly of the laws relative to the privileged motions and the secondary or subsidiary motions. I have found further that then it is an easy matter to impart information as to other and lesser principles, by mere subsequent statements of the latter.

Therefore, according to the present invention, the device involves primarily a means for the teaching of the powers and of the relations between the privileged motions and the secondary or subsidiary motions and between the various motions of each group; and the educational set of elements, as preferably employed and hence as herein illustrated and described includes only elements standing for the privileged and secondary or subsidiary motions.

An important feature of the invention is the provision of elements or blocks, hereinafter referred to as blocks, for certain of the motions having certain features in common and yet at the same time features individually different so far as each block is concerned. These blocks are the blocks representing the motion for the main question, and the motions to amend the main question or to amend an amendment or amendments to the main question.

Another important object of the invention is to provide certain of the blocks, and particularly one thereof, that is, the block standing for the motion for the main question, so shaped that while such block may itself rest by gravity on a suitable support, as a tutor's desk, the said block is further so shaped, in combination with a proper shaping of other blocks, as the plurality of blocks each representing a motion to amend, that one and even a plurality of the amendment blocks may be supported by gravity on top of the main question block, thus to indicate graphically the putting and the readiness to vote on one or more of such amendment blocks overlying or dominating the main question block. It will be understood in this connection that when such amendment block is actually voted on by the class, and "carried" according to the language of parliamentary law, such amendment block is left on top of the main question block and is thus, graphically and truly, actually carried or physically imposed on the main question block as an upholding foundation. Such a superposition of one or more amendment blocks on the main question block, or the superposition just mentioned plus the superposition of an amendment block on another amendment block on the main question block, is an example of one of the significant combinations or juxtapositions of the educational elements of the present invention as above mentioned.

The invention has other features which will be fully explained, and the invention itself will be better appreciated, from the following description of the various blocks illustrated in the drawing and the method of using such blocks; with the understanding, however, that such drawing illustrates, merely by way of example, one possible embodiment only of a set of the educational elements employable to facilitate a carrying out of the new method.

In said drawing,

Figs. 1 to 4, both inclusive, illustrate blocks of dissimilar shapes which represent the group of privileged motions, Fig. 1 showing a cone, representing the motion to fix the time to which to adjourn, Fig. 2 showing an obliquely cut cone representing the motion to adjourn, Fig. 3 showing a hemisphere representing the motion or the rising to a question of privilege (or point of order), and Fig. 4 showing a disk indicating the orders of the day;

Figs. 5 to 10, both inclusive, illustrate blocks of further dissimilar shapes, which represent the group of secondary or subsidiary motions, Fig. 5 showing a miniature table, representing the motion to table or to take from the table, Fig. 6 showing a bar of triangular cross-section, representing the motion to postpone indefinitely, Fig. 7 showing a pyramid, representing the motion for the previous question, Fig. 8 showing a truncated cone, representing the motion to postpone to a set time, Fig. 9 showing a cylinder, representing the motion to refer to a committee (or to commit or re-commit), and Fig. 10 showing two duplicate cubes, each representing a motion to amend the main question;

Fig. 11 shows a cube, but larger than the cubes of Fig. 10, representing the motion for the main question; and Fig. 12 shows a collection of various blocks of the kind already described, combined or juxtaposed according to a possible mode of using the blocks to indicate that the main question is subordinate to all and is subject to and under the control of a vote on any or several of the motions corresponding to the blocks of Figs. 1 to 10, and particularly (or rather most commonly), subject to motions to amend and to commit.

Applying reference characters to the various elements of the drawing, the block of Fig. 1 is marked 1, the block of Fig. 2, 2, the block of Fig. 3, 3, the block of Fig. 4, 4, the block of Fig. 5, 5, the block of Fig. 6, 6 the block of Fig. 7, 7, the block of Fig. 8, 8, the block of Fig. 9, 9, and the blocks of Fig. 10, 10$^a$ and 10$^b$.

It should be emphasized that as many of the blocks of Fig. 10 as desired may be provided, such as cubes 10$^c$ and 10$^a$ of the same size, as shown in Fig. 12.

The block of Fig. 11 is marked 11.

In the case of the blocks of Fig. 12, and indeed in the case of all the blocks, when the main question block 11 and the other blocks are to be arranged in significant relation thereto, that is, in relations indicative from the relative positions of the blocks that block 11 has been successively subjected to the dominant influences of another or various other blocks, the blocks may be provided with staples 12, as shown in the case of the blocks of Fig. 12, so that a piece of string 14, desirably equipped with a bodkin 15, may be threaded through the staple of block 11, when a main question is brought before the house and hence hung on the thread of its interest, and then through various other blocks representing subsequently brought motions affecting the motion which block 11 stands for, as say the blocks 10°, 10ª, and 9, another block 10ª, and a block 10ᵈ, as illustrated in Fig. 12. From a reference to the rules of parliamentary law, it will be clear that the combination of significantly juxtaposed blocks of Fig. 12 represents a situation wherein a main question, say for the purchase of a rug for the schoolroom, has been brought (block 11); next, and during the time open for discussing an amendment of the main question, and hence before voting can take place on the main question, a motion has been brought to amend the motion for the purchase of the rug, by moving to purchase a blue rug, (block 10°); and thereafter, in the sequence indicated, and during said time, motions have been brought to further amend the main question by moving to purchase a blue rug with green spots (block 10ª), a motion to commit (block 9), a motion to amend the motion to commit by instructing the committee as to a price limit (the block 10ª to the right) and a motion further to instruct the committee to pay not less than a certain price (block 10ᵇ). It will be understood in this connection that graphic indications of other motions dominant relative to the motion for the main question, may be indicated by adding another or other blocks to thread 14, or by substituting another block or other blocks for some or all of the blocks of Fig. 12 except the block 11. Thus, if a motion for the previous question had been brought immediately after the block 10ª to the right of Fig. 12 was attached to the main question block, block 7 would have been attached to thread 14 in place of block 9. This situation would have required an immediate vote on the main question as amended by the two blocks to the right of block 11 of Fig. 12. If, then, the motion for which block 7 stood had been carried, the time for adding further blocks to thread 14 would have been ended. In the same way, the powers of the motions to table, postpone indefinitely, to postpone to a set time, to adjourn the meeting (block 2), etc., would have had the right if carried, in effect to kill the main question. This specification could be strung out to great length, if all the various possible combinations and juxtapositions, were described with the same detail as the particular combination just above.

It is pointed out, however, that in the present case, and which has been found in actual practice to be preferable for maximum efficiency in quickly teaching parliamentary law, the set of blocks representing the privileged motions as aforesaid, the secondary or subsidiary motions also as explained, and the motion for the main question (subordinate to all other motions), but with such set not necessarily including blocks representing the incidental motions, has very important characteristics, some of which will be seen from the drawing and some of which are as follows: Blocks 10ª and 10ᵇ, and the other blocks of the same size and shape, representing amendments to the main question, are of the same shape and yet smaller in size than the block representing the main question. That is to say, all the block 10ª, 10ᵇ, 10°, 10ᵈ, etc., are cubes like block 11, but smaller cubes. Again, while it has been found desirable to have all the blocks except certain of the amendment blocks finished in natural wood color, or some finsh common to all such blocks, others of the small cube or amendment blocks have been found most useful when of different colors, that is, each block preferably a single color but each of the blocks of a different color. Thus, adverting to Fig. 12, when the main question stands for a motion to purchase a rug as aforesaid, a motion to amend to purchase a blue rug would call for the juxtaposition, relative to block 11, of a small cubical block colored blue. Or, if a member of the class makes the motion for the main question, and another member, given the pseudonym "Mr. Green," then makes the amending motion, a small cubical block of green color will be placed alongside of block 11, or on top of block 11 (when carried), or strung on thread 14 as above described.

Further, it is well known in practice that a motion bona fide made and not desired to be "smothered" by the "opposition" is in practically all cases finally brought to the point where the motion must meet with a fate fixed by the vote of the assemblage and from which there is seldom an appeal or reconsideration, and to indicate this critical situation relative to a motion, the motion for such a vote, that is, the motion for the previous question, block 7, is, as here, of a shape to indicate its importance. Thus, in the present case, the pyramid of Fig. 7 has such an altitude as to tower over even the block 11.

Further to illustrate a possible use of the blocks of the drawing, suppose a student says, "I move we buy a desk." The instructor places on a table block 11, and as the teacher does so, he, acting as chairman, states the motion and calls for remarks. Now suppose another student moves to amend the motion by inserting the word "brown" before the word "desk" in the motion as formerly stated by the chair. Thereupon the chair places a small brown cubical block to the right of block 11, meanwhile stating the amending motion and calling for remarks on the same. Other motions to amend may now be made, and small cubical blocks representing such other motions are placed to the right of the brown one. As these amending motions are disposed of, by vote, the small cubical blocks are accordingly disposed of. For instance, if a motion to amend is lost, it is tossed aside or to the floor; and if a motion is carried, it is either left adjacent to the block 11 or placed on top of the same. Thus it will be seen that the blocks permit a method of graphic instruction in parliamentary law to be carried out, and a method whereby the eye sees what is done, by the actual handling of the blocks. Parliamentary law is an abstract science, and the blocks are used to make it concrete. It has actually been found in practice that there may be six, eight or ten motions pending at one time, and all in order and clearly understood by the use of the blocks.

I claim:

1. A device for teaching parliamentary law comprising a series of geometrical figures of three dimensions, so designated, and adapted to be so arranged that the designations and arrangement will illustrate a principle of procedure of parliamentary law.

2. A device for teaching parliamentary law comprising a series of geometrical figures of three dimensions, adapted to be connected together, so designated, and adapted to be so arranged that the designations and arrangements will illustrate a principle of procedure of parliamentary law, and means for connecting said figures in a systematic arrangement.

3. A device for teaching parliamentary law comprising a series of geometrical blocks having various shapes and sizes, so designated, and adapted to be so arranged that the designations, arrangements, shapes and sizes will illustrate a principle of procedure of parliamentary law, the designations taken in conjunction with the shapes and sizes being indicative of various concepts of the rules which are subordinate to the principal rules of procedure in parliamentary law.

EMMA LARD LONGAN.